United States Patent [19]

Hansen et al.

[11] Patent Number: 5,449,523

[45] Date of Patent: Sep. 12, 1995

[54] PROCESS FOR THE MANUFACTURE OF A CALCIUM FORTIFIED YOGURT WITH IMPROVED HEAT STABILITY

[75] Inventors: Poul M. T. Hansen; Karen Fligner, both of Columbus, Ohio

[73] Assignee: The Ohio State University Research Foundation, Columbus, Ohio

[21] Appl. No.: 49,920

[22] Filed: Apr. 20, 1993

[51] Int. Cl.$^6$ ............................................. A23C 9/12
[52] U.S. Cl. ...................................... 426/42; 426/43; 426/522; 426/583
[58] Field of Search ................... 426/34, 42, 43, 580, 426/583, 271, 521, 522

[56] References Cited

U.S. PATENT DOCUMENTS

| | | | |
|---|---|---|---|
| 2,541,568 | 2/1951 | Baur et al. | 99/54 |
| 4,066,794 | 1/1978 | Schur | 426/61 |
| 4,143,172 | 3/1979 | Mitchell et al. | 426/532 |
| 4,219,581 | 8/1980 | Dea et al. | 426/565 |
| 4,258,064 | 3/1981 | Michener, Jr. | 426/43 |
| 4,318,932 | 3/1982 | Ewing et al. | 426/285 |
| 4,374,152 | 2/1983 | Loter | 426/39 |
| 4,430,349 | 2/1984 | Malone et al. | 426/34 |
| 4,748,026 | 5/1988 | Keefer et al. | 426/43 |
| 4,784,871 | 11/1988 | Park | 426/583 |
| 4,797,289 | 1/1989 | Reddy | 426/43 |
| 4,840,814 | 6/1989 | Harada et al. | 426/580 |
| 4,906,482 | 3/1990 | Zemel et al. | 426/74 |
| 4,959,234 | 9/1990 | Ahmed et al. | 426/580 |
| 4,971,810 | 11/1990 | Hoyda et al. | 426/43 |

FOREIGN PATENT DOCUMENTS 0235971 9/1987 European Pat. Off. .
0449354 10/1991 European Pat. Off. .
61-88837 5/1986 Japan .
2161361 1/1986 United Kingdom .

OTHER PUBLICATIONS

"Effect of Disodium Hydrogen Phosphate and Sodium Citrate On Heat Stability of Buffalo Milk", *Indian J. Dairy Sci.,* vol. 41, 2, 1988 pp. 177–179.

"Complexing of Calcium By Hexametaphosphate, Oxalate, Citrate, and Edta in Milk. 1. Effects of Complexing Agents on Turbidity and Rennet Coagulation", *J. Dairy Sci.,* vol. 47, pp. 1306–1309, (1964).

"Effects of Added Salts on the Heat Stability of Recombined Concentrated Milk", *J. of Dairy Research,* vol. 57, pp. 213–226 (1990).

"Methods for Increasing Calcium in Cottage Cheese", *Cultured Dairy Products Journal,* Aug. 1991, pp. 11–18.

"Fortification of Low-Fat Plain Yogurt With Calcium Gluconate", *Cultured Dairy Products Journal,* Feb. 1988, pp. 5–9.

"Complexing of Calcium by Hexametaphosphate, Oxalate, Citrate, and Ethylenediamine Tetraacetate in Milk. II, Dialysis of Milk Containing Complexing Agents", *J. Dairy Sci.,* vol. 48, 19 (1965) pp. 19–22.

*Primary Examiner*—Leslie A. Wong
*Attorney, Agent, or Firm*—Ralph J. Mancini; Louis A. Morris

[57] ABSTRACT

The present invention relates to a process for preparing a calcium-fortified yogurt whereby the calcium source can be added to the yogurt milk base prior to pasteurization without undesirable protein precipitation. The disclosed process allows one to prepare a calcium-fortified yogurt with minimal deviation from normal yogurt manufacturing methods.

17 Claims, No Drawings

PROCESS FOR THE MANUFACTURE OF A CALCIUM FORTIFIED YOGURT WITH IMPROVED HEAT STABILITY

BACKGROUND OF THE INVENTION

1. Field of the Invention

The invention generally relates to a process of making a calcium fortified yogurt milk blend with improved heat stability suitable for making yogurt.

2. Description of the Prior Art

Yogurt is a combination of dairy ingredients such as whole milk, partially skimmed milk, skim milk, non-fat dry milk and the like which have been cultured to a specific acidity with an appropriate bacterial culture following heat treatment at elevated temperatures. Production begins with the homogenization and pasteurization of the dairy ingredients at high temperatures followed by cooling to 40° C. to 50° C. for inoculation with the culture. The culture is allowed to grow, produce acid, and reduce pH to a level where curdling or coagulation will occur.

Recently, calcium has received increased attention in dietary regimes because of its possible role in the prevention of diseases such as osteoporosis, hypertension and colon cancer. Calcium is a major mineral and essential in human nutrition. It is the most abundant cation in the body where approximately 99% of the calcium occurs in the bones and teeth providing an exchangeable pool of calcium, strength and structure. The remaining one percent is widely distributed in cells and body fluids and is responsible for the regulation of a number of metabolic functions such as nerve impulse conduction, muscle fiber contraction, hormone secretion, blood coagulation, normal heart beat, activation of enzymes and maintenance of cell membranes. The reference daily intake (RDI) for calcium is currently 1000 mg for adult males and females. Dairy products represent an excellent source of calcium, and in Western countries, the RDI for calcium is primarily met through the consumption of dairy products. It is generally believed that certain disease states, such as osteoporosis, are a result of habitual low intakes of calcium throughout the life span, related to low intakes of dairy products. Currently, it is recommended that individuals at risk for calcium-related disease, particularly Caucasian and Asian women in relation to osteoporosis, increase their calcium intake to a minimum of 1000 mg calcium per day.

Accordingly, a need exists for calcium fortified food products which will provide larger amounts of calcium in a single serving. A calcium-fortified yogurt would meet the needs of individuals at risk for calcium-related disease and provide individuals who choose not to consume large amounts of dairy products an alternative to tablet supplements to meet their calcium requirements.

Calcium enriched yogurts have been developed and used from time to time in the past. However, until development of the present process, calcium fortified yogurts have had serious drawbacks such as off-taste, insufficient heat stability, and cumbersome preparation steps which require the addition of sterile calcium to the yogurt after pasteurization.

The difficulties encountered when preparing a calcium fortified yogurt are primarily due to the heat sensitivity of the milk proteins upon the addition of ionic calcium. More specifically, the addition of ionic calcium to a milk system results in a pH decrease which is partially responsible for observed protein precipitation upon application of heat. Thus, many prior art yogurts circumvent the foregoing heat stability problems by adding sterile calcium sources after the heat treatment/pasteurization steps. This procedure is, however, cumbersome and uneconomical.

Many calcium fortified dairy products which have appeared in the retail market are fortified with tricalcium phosphate (TCP) and some hydrocolloid stabilizers. Since the solubility of TCP is very low, it does not seriously affect the heat stability of the product and can safely be added prior to pasteurization. Milk and yogurt fortified with TCP are, however, unacceptably gritty, sometimes with noticeable sedimentation of the TCP which can foul the manufacturing equipment.

In the article to Fligner, et al., Cultured Dairy Products Journal, pp.5, February 1988, a low-fat yogurt product fortified with calcium gluconate is disclosed. The article clearly states, however, that since the calcium gluconate-milk blend was not heat stable, calcium gluconate addition must take place after pasteurization.

U.S. Pat. No. 4,784,871 discloses a method for preparing a calcium fortified yogurt wherein an acid soluble calcium salt is added to fruit flavoring which is subsequently combined to the yogurt base. The calcium addition occurs after pasteurization of the yogurt base.

Accordingly, it is an object of the present invention to provide a process for preparing a calcium fortified yogurt with minimum change from normal yogurt processing. A further object is to prepare a calcium fortified yogurt with improved heat stability. Still another object of the invention is to prepare a calcium fortified yogurt that does not suffer from off-taste or undesirable sedimentation of the calcium source.

SUMMARY OF THE INVENTION

The present invention generally relates to a process for the preparation of a calcium fortified yogurt. The process comprises preparing a yogurt base mix which comprises at least one fermentable dairy ingredient, a calcium source, a chelating agent and/or an alkaline agent. The chelating and/or alkaline agents are added in amounts effective to keep the pH of the yogurt base mix above about 6.7 prior to pasteurization. After pasteurizing the yogurt base mix, the mix is optionally homogenized, thereafter cooled, inoculated with yogurt producing microorganisms and incubated at conditions effective to obtain a calcium-fortified thickened yogurt product.

DETAILED DESCRIPTION OF THE INVENTION

The present invention discloses a process for the preparation of a calcium fortified yogurt product with no off-taste and improved heat stability. The process comprises preparing a yogurt base mix comprising at least one fermentable dairy product and a calcium source, wherein the pH of said yogurt base mix is adjusted to and/or maintained at a pH above about 6.7 prior to pasteurization. The adjustment and/or maintenance of pH can be accomplished by use of a chelating agent(s), an alkaline agent(s), or mixtures thereof in amounts effective to adjust and/or maintain the pH of the base mix above about 6.7 prior to pasteurization. The calcium-fortified yogurt base mix is then optionally homogenized and thereafter pasteurized, cooled to a temperature of from 35° C.–55° C. and inoculated with yogurt starter cultures. The inoculated yogurt mix is then incubated at conditions effective to obtain a thickened yogurt product, and thereafter cooled to stop fermentation.

The present invention is predicated on the unexpected discovery that the heat stability of the yogurt system can be dramatically improved if the pH of said system is not allowed to drop below about 6.7 prior to pasteurization. The addition of chelating agent(s) and/or alkaline agent(s) to the yogurt base mix at approximately the same time the calcium source is added in amounts effective to prevent the pH of the yogurt base mix from dropping below about pH 6.7 is effective in this regard. In practice, the addition of a chelator moderates the pH drop while the addition of an alkaline agent acts to restore the pH to that of normal milk. The unexpected improvement in heat stability of the present invention allows one to prepare a calcium-fortified yogurt wherein the calcium source can be added to the yogurt base mix prior to heat treatment and/or pasteurization without undesirable milk protein precipitation.

Without wishing to be bound to a particular theory, the addition of calcium salts to a milk system causes an immediate pH drop which appears to be caused by a phenomenon involving the binding of calcium ions by milk proteins and the simultaneous release of protons to replace the calcium ions. Accordingly, the increased heat-sensitivity of a milk system after calcium addition appears to be the result of both calcium binding and pH decrease.

At lower calcium fortification levels, it is possible to prepare acceptable yogurts when only a chelating agent is employed to moderate the pH drop of the system. At higher calcium fortification levels it is, however, preferred and in many cases necessary to utilize both a chelating agent to moderate pH drop and an alkaline agent to restore the pH to that of normal milk. Additionally, at higher calcium fortification levels superior yogurts were obtained when the pH of the yogurt base mix was elevated to about pH 7.0–7.2 prior to pasteurization.

It has further been observed that as the ratio of added calcium to milk calcium increases, it is more likely that both chelate and alkaline agents will be required to produce an acceptable product. Therefore, for economy type yogurts having milk solids non-fat of about 12.5%, it is likely that both chelating and alkaline agents will be required at moderate added calcium loads. The opposite is also true, i.e., at low added calcium to milk calcium ratio, i.e., at higher milk solids nonfat percentages, it is possible to prepare yogurts employing only citrate or only alkaline agent. It is essential in all of the foregoing that the pH of the yogurt base mix not be allowed to decrease below the pH of normal milk, i.e., about pH 6.7. At highest added calcium to milk calcium ratios, best results were observed when the pH of the yogurt base mix was adjusted to a pH of about 7.0–7.2 prior to pasteurization.

The term "fermentable dairy product" means any dairy product which is or can be employed in conventional yogurt manufacturing methods including whole milk, lowfat milk, skimmed milk, skim milk, condensed milk, evaporated milk, cream, dry milk powder including non-fat dry milk powder (NFDM), and the like. Alternatively, a calcium fortified dry milk powder can be employed in the present invention. Directions for preparing such a calcium fortified dry milk powder can be found in Example 5.

Any food grade calcium source can be employed in the present invention. The preferred calcium source is a water-soluble calcium salt of an organic acid. The water-soluble calcium salt is preferably selected from calcium gluconate, calcium lactate, calcium ascorbate, calcium malate, calcium caseinate, calcium citrate, calcium sulphate, calcium carbonate, calcium saccharate, calcium lactogluconate, mixtures thereof and the like. Calcium gluconate, calcium lactate and calcium lactogluconate are the most preferred calcium sources. All of these calcium sources are commercially available through Akzo Chemicals Inc., Chicago, Ill. Alternatively, the calcium source can be provided by a calcium fortified dry milk powder.

The calcium level selected for yogurt milk depends on the reference daily intake (RDI), the desired percentage of the RDI which is chosen, the serving size, and the level of milk calcium. Currently, the RDI for calcium is 1000 mg per 225 g serving. The processing temperature may vary depending on the added calcium load in the milk, the amount of citrate and the need for pH adjustment.

Any food grade chelating agent can be employed in the present invention with alkali metal citrates being preferred. Preferred alkali metal citrates include potassium citrate, sodium citrate and mixtures thereof. The amount of chelating agent added to the system should be effective to moderate or substantially eliminate any significant pH reduction. In most situations, about 0.1 to about 0.3 moles of citrate for every mole of total calcium in the system produces satisfactory results.

The alkaline agent preferably employed is a food grade alkaline agent that does not adversely affect the taste, smell, etc. of the final product. Preferred alkaline agents include alkali metal hydroxides. Preferred alkali metal hydroxides include potassium hydroxide, sodium hydroxide and mixtures thereof.

The chelating and/or alkaline agent may be added to the yogurt base mix either before, after or at the same time as the addition of the calcium salt.

The yogurt base mix may also contain numerous other optional ingredients including sugars, gelatins, fiber, flavorings, stabilizers, and the like.

It is preferable that the yogurt base mix contain milk solids in amounts of, for example, between about 10% and about 25% by weight. Desirable results are also obtained when the milk solids content of the yogurt base before pasteurization is about 15%, for example, between about 15% and 21%. The butter fat content may be between 0.5% and 6%.

Homogenization is optionally carried out in order to promote a smooth texture to the yogurt and aid in the dispersion. Any prior art homogenization conditions can satisfactorily be employed in the present invention.

The pasteurization step is performed using techniques well known in the art, preferably at legally specified time and temperature conditions. While pasteurization may be carried out at many different temperature/exposure time combinations, the body and texture of the yogurt is generally improved with the application of high heat treatment, or heat treatment sufficient to cause substantial whey protein denaturation. The process of the present invention generally permits exposures to the high temperatures which are effective in preparing good quality yogurt. A particularly useful method employs heating the dairy base at a temperature between about 170° and 210° in a plate heat exchanger or a kiln. Temperatures above 210° F. are possible, but the pasteurization must be performed under pressure above 210° F. A preferred heating range for pasteurization is between about 180° and 195° F. After pasteurization, the mixture is cooled to incubation temperature.

Incubation is effected by inoculating the pasteurized dairy base within the temperature range of 95° F. to 115° F. with a culture of a yogurt producing microorganism, for example, *Streptococcus thermophilus* and *Lactobacillus bulgaricus*. The microorganisms are allowed to incubate until the pH of the yogurt product is between about 3.5 to 5.0. Preferably, the pH of the yogurt is about 4.2–4.6, a result typically obtained after about 3–4 hours of incubation.

In a preferred embodiment the invention comprises pasteurizing a yogurt base mix which comprises at least one fermentable dairy ingredient, a calcium source, potassium hydroxide and sodium citrate, wherein said potassium hydroxide and sodium citrate are added in amounts effective to prevent the pH of the base mix from dropping below about 6.7 prior to pasteurization. The base mix is then pasteurized, optionally homogenized, cooled, inoculated with a yogurt starter culture at a temperature of about 100° F. to about 115° F. and, incubated until the pH of the base is reduced to between about 3.5 and 5.0 to obtain a calcium-fortified yogurt product.

The invention will now be illustrated by the following nonlimiting examples.

EXAMPLE 1

Preparation of Calcium-Fortified Yogurt with 60.5% RDI for Calcium

Initially, a calcium gluconate/calcium saccharate solution (1.87% calcium) containing 20% solids of which 90% is calcium gluconate and 10% is calcium saccharate was prepared by weighing the appropriate amount of calcium compounds into a pyrex jar and autoclaving at 250° F. for up to 30 minutes. Upon removal from the autoclave, the jar was tightly capped and vigorously shaken until the solution was clear. The solution was cooled and diluted to the appropriate volume.

A standard cultured yogurt product was prepared as follows:
0.276 kg sugar (granulated), 0.79 kg NFDM and 0.021 kg sodium citrate were dry blended and simultaneously added with 0.40 kg calcium gluconate/calcium saccharate (1.87% calcium) to a mixture of 8.55 kg milk (0.05% skim) and 0.51 kg cream (41% fat) under agitation. The mixture was heated to 100° F. and homogenized (2500psi) to aid in the dispersion before being processed, without difficulty, at 190° F. for thirty seconds. The pasteurized yogurt milk base was then inoculated with 0.44 kg starter and incubated to proper pH for a standard cultured yogurt product. All calcium-fortified yogurts were inoculated at a 4% rate. The inoculum was skim milk (0.05% fat) which had been inoculated with the starter organisms the day before. A 225 gram serving of the sweetened unflavored product contained 188 calories and 605 mg calcium (60.5% RDI) and was superior in flavor, body and texture. No precipitation was observed during pasteurization.

Comparative Example 1

A calcium fortified yogurt with 60.5% RDI for calcium was prepared in accordance with the procedure of Example 1 with the exception that no chelator (sodium citrate) was employed. More particularly, a standard cultured yogurt product was prepared having the following ingredients.

| Milk (0.05% skim) | 9.02 kg |
|---|---|
| Cream (41%) | .51 kg |
| NFDM - | .788 kg |
| Calcium Gluconate/ Calcium Saccharate solution (1.87% calcium) | 0.405 kg |

After combining the ingredients under agitation, the base mix was pasteurized at 180° F. Substantial protein precipitation was observed which prevented further processing.

EXAMPLE 2

Preparation of Calcium-Fortified Yogurt with 67.5% RDI for Calcium

A standard yogurt culture was prepared as follows: 0.8096 kg NFDM, 0.024 kg sodium citrate (0.1M), and 0.276 kg sugar (granulated) were dry blended and simultaneously added with 0.567 kg calcium gluconate/calcium saccharate (1.87% calcium) to a mixture of 8.408 kg milk (0.05% skim) and 0.45 kg cream (46%) under agitation. The mixture was heated to 100° F. to aid in the dispersion before being processed, without difficulty, at 175° F. for thirty seconds. The pasteurized yogurt base was then homogenized (2500 psi), inoculated with 0.44 kg starter and incubated to proper pH for a standard yogurt product. A 225 gram serving had 191 calories and 675 mg calcium (RDI=67.5%). No precipitation was observed during pasteurization.

Comparative Example 2

A calcium fortified yogurt with 67.5% RDI for calcium was prepared as in Example 2 with the exception that no chelator was employed. More specifically, a standard yogurt was prepared having the following ingredients:

| Milk (0.05% skim) | 8.87 kg |
|---|---|
| Cream (46% Fat) | .454 kg |
| NFDM | .807 kg |
| Sugar (granulated) | .276 kg |
| Calcium gluconate/ Calcium saccharate solution (1.87% calcium) | .587 kg |

After combining the ingredients under agitation, the base mix was pasteurized at 175° F. Substantial precipitation was observed which predicated further processing.

EXAMPLE 3

Preparation of a Calcium-Fortified Yogurt with 80.3% RDI for Calcium

A standard yogurt product was prepared as follows: 0.77 kg high heat NFDM, 0.2764 g granulated sugar, 0.057 Kg sodium citrate and 0.169 kg calcium lactogluconate (CAL) were dry blended and added to a mixture of 8.75 kg milk (0.05% skim) and 0.498 kg cream (42%) along with 0.11 Kg NaOH (1N).

The mixture was heated to 100° F. and homogenized (2500 psi) to aid in dispersion before being processed, without difficulty, at 175° F. for thirty seconds. The pasteurized yogurt milk base was then inoculated with 0.44 kg starter and incubated to proper pH for a standard cultured yogurt product. A 225 gram serving of the yogurt product had 191 calories and 803 mg of calcium and was acceptable in flavor, body and texture. No precipitation was observed during pasteurization.

Comparative Example 3

A calcium-fortified yogurt with 80.3% RDI for calcium was prepared as in Example 3 except that no chelating agent was employed. The yogurt base had the following ingredients:

| | |
|---|---|
| Milk (0.05% skim) | 9.29 kg |
| Cream (42% fat) | .4982 kg |
| Sugar (granulated) | .276 kg |
| NFDM | .764 kg |
| CAL | .169 |

After combining the ingredients under agitation the base mix was pasteurized at 175° F. Substantial precipitation was observed which prevented further processing.

EXAMPLE 4

Preparation of a Calcium-Fortified "Economy" Yogurt with 56.3% RDI for Calcium

A calcium-fortified "economy" yogurt with 56.3% RDI for calcium was prepared as follows:

0.28 kg sugar, 0.52 kg NFDM and 0.08 kg calcium lactogluconate (CAL) were dry blended and added to a mixture of 9.10 kg milk (0.05% skim) and 0.38 kg cream (43% fat). The product was stabilized with 0.15M sodium citrate and KOH to adjust the product to pH 7.0 before heat processing, at 190° F., without difficulty. The pasteurized yogurt milk base was then inoculated with 0.44 kg starter and incubated to proper pH for a standard cultured yogurt product. The final product contained 12.5% MSNF, 1.55% fat, 563 mg calcium and 163 calories per 225 g serving and was judged to possess excellent quality and physical characteristics.

EXAMPLE 5

A Calcium-Fortified Yogurt With 80.4% RDI for Calcium Prepared with Calcium-Fortified NFDM This example provides a simplified approach to calcium fortification by employing an already calcium fortified NFDM to serve as both the calcium source and as a source of the NFDM.

A 50 pound batch of the calcium fortified NFDM was prepared as follows: 37.5 lbs. condensed milk (29% solids), 7.0 lbs. NFDM, 1.13 lbs. K-Na citrate and 4.39 lbs. CAL were mixed together under agitation. The mixture had a calcium level of 3.04% of total solids, 35% milk solids non-fat (MSNF) and contained a mixture of K-Na citrate at a molar ratio of 0.15 based on the total calcium present in the system. The pH of the mixture was then adjusted to 7.0 with 1N KOH, heated to 72° C. under constant stirring and then rapidly cooled to 1°-2° C. to initiate lactose crystallization. The concentrate was seeded by addition of 25 grams of lactose and held for 1-2 hours under agitation. Finally, the cold concentrate was spray dried to form a neutralized calcium-fortified NFDM. The dry powder contained 3% moisture and 2.95% calcium.

A calcium-fortified yogurt was prepared by dry blending 0.90 kg of the above calcium-fortified NFDM, which contains 3.04% calcium based on the total solids of the mixture and K-Na citrate at a molar ratio of 0.15 based on the total calcium in the system, with 0.28 kg sugar and adding same to a mixture of 9.20 kg milk (0.05% skim) and 0.56 kg cream (38%) under agitation. The mixture was then heated to 100° F. to aid in dispersion and the pH adjusted to be in the range of about 7.0-7.2 prior to pasteurization. The yogurt was pasteurized without difficulty at a temperature of about 190° F. and subsequently homogenized (2500 psi), inoculated and incubated to proper pH for a standard yogurt product. A 225 gram serving had 191 calories, 804 mg calcium (80.4% RDA) and was judged to be a superior product possessing excellent quality and physical characteristics.

We claim:

1. A process for the preparation of a calcium-fortified, thickened yogurt which comprises:
   (a) preparing a yogurt base mix comprising at least one fermentable dairy ingredient, a calcium source, and a member selected from the group consisting of an alkaline agent, a chelating agent and mixtures thereof, wherein said alkaline agent, chelating agent and mixtures thereof are added in amounts effective to maintain the pH of the yogurt base mix above about 6.7 prior to pasteurization;
   (b) optionally homogenizing and thereafter pasteurizing the yogurt mix;
   (c) cooling the yogurt base mix to a temperature of from 35° C.-55° C. and inoculating same with yogurt starter cultures to obtain an inoculated yogurt mix; and,
   (d) incubating said inoculated yogurt mix at conditions effective to obtain a calcium-fortified thickened yogurt.

2. The process of claim 1 wherein said fermentable dairy ingredient is selected from the group consisting of whole milk, lowfat milk, skim milk, partially skim milk, cream, condensed milk, evaporated milk, dry milk powder, nonfat dry milk powder, calcium fortified nonfat dry milk powder, and mixtures thereof.

3. The process of claim 1 wherein said chelating agent is an alkali metal citrate.

4. The process of claim 3 wherein said alkali metal citrate is selected from the group consisting of sodium citrate, potassium citrate and mixtures thereof.

5. The process of claim 1 wherein said alkaline agent is an alkali metal hydroxide.

6. The process of claim 5 wherein said alkali metal hydroxide is selected from the group consisting of potassium hydroxide, sodium hydroxide and mixtures thereof.

7. The process of claim 1 wherein said calcium source is a water-soluble calcium salt of an organic acid.

8. The process of claim 7 wherein said water-soluble calcium salt is selected from the group consisting of calcium lactate, calcium gluconate, calcium-lactogluconate, calcium fortified nonfat dry milk and mixtures thereof.

9. The process of claim 1 wherein the pH of the yogurt base mix is adjusted to a pH in the range of about 7.0-7.2 prior to pasteurization.

10. A process for the preparation of a calcium-fortified, thickened yogurt which comprises preparing a yogurt base mix comprising at least one fermentable dairy ingredient and a calcium source wherein the pH of said yogurt base mix is maintained above about 6.7 prior to pasteurization; optionally homogenizing and thereafter pasteurizing the yogurt base mix; cooling the yogurt base mix and inoculating same with yogurt starter cultures; and, incubating the base mix until the pH is reduced to between about 3.5 to about 5.0 to produce a calcium-fortified thickened yogurt.

11. The process of claim 10 wherein said calcium source is a water-soluble calcium salt of an organic acid.

12. The process of claim 11 wherein said water-soluble calcium salt is selected from the group consisting of calcium lactate, calcium gluconate, calcium-lactogluconate, calcium fortified nonfat dry milk and mixtures thereof.

13. The process of claim 10 wherein the pH of the yogurt base mix is adjusted to a pH in the range of about 7.0-7.2 prior to pasteurization.

14. The process of claim 10 wherein a member selected from the group consisting of chelating agents, alkaline agents and mixtures thereof are added to said yogurt base mix in amounts effective to maintain the pH of the base mix above about pH 6.7 prior to pasteurization.

15. The process of claim 14 wherein said alkaline agent is selected from the group consisting of potassium hydroxide, sodium hydroxide and mixtures thereof, and said chelating agent is selected from the group consisting of sodium citrate, potassium citrate and mixtures thereof.

16. A process for the preparation of a calcium-fortified, thickened yogurt which comprises preparing a yogurt base mix comprising at least one fermentable dairy ingredient and a calcium source, wherein the pH of the yogurt base mix is adjusted to a pH of about 7.0-7.2 prior to pasteurization; optionally homogenizing and thereafter pasteurizing the yogurt base mix; cooling the yogurt base mix to a temperature of from 35° C.-55° C. and inoculating same with yogurt starter cultures to obtain an inoculated yogurt mix; and, incubating the inoculated yogurt mix at conditions effective to obtain a calcium-fortified thickened yogurt.

17. The process of claim 16 wherein said fermentable dairy ingredient comprises milk, nonfat dry milk and cream, said calcium source is selected from the group consisting of calcium lactate, calcium gluconate, calcium lactogluconate, calcium fortified NFDM and mixtures thereof, and the pH of the yogurt base mix is adjusted to a range of about 7.0-7.2 prior to pasteurization by use of a member selected from the group consisting of chelating agents, alkaline agents and mixtures thereof.

* * * * *